US011314015B2

(12) United States Patent
Hayashi et al.

(10) Patent No.: US 11,314,015 B2
(45) Date of Patent: Apr. 26, 2022

(54) MULTI-CORE OPTICAL FIBER

(71) Applicant: SUMITOMO ELECTRIC INDUSTRIES, LTD., Osaka (JP)

(72) Inventors: Tetsuya Hayashi, Osaka (JP); Takuji Nagashima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/203,023

(22) Filed: Mar. 16, 2021

(65) Prior Publication Data

US 2021/0294025 A1 Sep. 23, 2021

(30) Foreign Application Priority Data

Mar. 19, 2020 (JP) .............................. JP2020-049135

(51) Int. Cl.
*G02B 6/02* (2006.01)
*G01M 11/00* (2006.01)
*G02B 6/036* (2006.01)

(52) U.S. Cl.
CPC ......... *G02B 6/02042* (2013.01); *G01M 11/30* (2013.01); *G02B 6/02395* (2013.01); *G02B 6/03616* (2013.01); *G02B 6/023* (2013.01)

(58) Field of Classification Search
None
See application file for complete search history.

(56) References Cited

U.S. PATENT DOCUMENTS

| | | |
|---|---|---|
| 2006/0147168 A1 | 7/2006 | DeMartino et al. |
| 2015/0268414 A1 | 9/2015 | Hayashi |
| 2016/0209583 A1 | 7/2016 | Hayashi et al. |
| 2017/0160454 A1 | 6/2017 | Tissot |
| 2017/0363508 A1 | 12/2017 | Hayashi et al. |

(Continued)

FOREIGN PATENT DOCUMENTS

| | | |
|---|---|---|
| JP | H08-094869 A | 4/1996 |
| WO | WO-2016/157639 A1 | 10/2016 |

OTHER PUBLICATIONS

B. Zhu, et al., "Seven-core multicore fiber transmissions for passive optical network," Optics Express, vol. 18, No. 11, May 24, 2010, p. 11117-p. 11122.

(Continued)

*Primary Examiner* — Michael Stahl
(74) *Attorney, Agent, or Firm* — Faegre Drinker Biddle & Reath LLP

(57) ABSTRACT

An MCF according to the disclosure has a structure preventing deterioration in quality of optical transmission signals. The MCF comprises cores, a common cladding, and a coating. Any of the cores has a coating leakage loss of 0.01 dB/km or more at a wavelength within a wavelength range of from 850 nm to 1700 nm. The coating includes a leaked light propagation suppressive coating layer having a first optical property or a second optical property to light with a wavelength within a wavelength range of from 850 nm to 1700 nm or from 1260 nm to 1625 nm. The first optical property is defined by, as an attenuation index of the light, an absorbance per 1 μm thickness being 0.1 dB or more. The second optical property is defined by a product of absorbance per 1 μm thickness and a thickness being 0.1 dB or more.

28 Claims, 6 Drawing Sheets

(56) References Cited

U.S. PATENT DOCUMENTS

2018/0120501 A1* 5/2018 Sasaki .................. G02B 6/44

OTHER PUBLICATIONS

Tetsuya Hayashi, "Multi-Core Fiber for High-Capacity Spatially-Multiplexed Transmission," [online], [Searched on Feb. 21, 2020], Internet URL: http://hdl.handle.net/2115/53864, Aug. 2013.
Tetsuya Hayashi, et al., "125-μm-Cladding Eight-Core Multi-Core Fiber Realizing Ultra-High-Density Cable Suitable for O-Band Short-Reach Optical Interconnects," Journal of Lightwave Technology, vol. 34, No. 1, Jan. 1, 2016, p. 85-p. 92.
M. Travagnin, "BER Penalty Induced by Coherent MPI Noise in FTTH Optical Links," Journal of Lightwave Technology, vol. 31, No. 18, Sep. 15, 2013, p. 3021-p. 3031.

* cited by examiner

MULTI-CORE OPTICAL FIBER

TECHNICAL FIELD

The present disclosure relates to a multi-core optical fiber (hereinafter referred to as "MCF").

This application claims priority to Japanese Patent Application No. 2020-049135, filed on Mar. 19, 2020, the entire contents of which are hereby incorporated by reference herein.

BACKGROUND

In recent years, MCFs applicable to transmission lines have been studied variously as shown in the following Non-Patent Documents 1 to 4. However, insufficient studies have been conducted on the cause of deterioration in signal quality in a wavelength range where light leakage into a coating becomes prominent.

(Patent Document 1) WO2016/157639

(Non-Patent Document 1) B. Zhu, et al., "Seven-core multicore fiber transmissions for passive optical network," OPTICS EXPRESS, VOL. 18, NO. 11, 24 May, 2010, pp. 11117-11122

(Non-Patent Document 2) Tetsuya HAYASHI, "Multi-Core Fiber for High-Capacity Spatially-Multiplexed Transmission," August 2013, [online], [Searched on Feb. 21, 2020], Internet <http://hdl.handle.net/2115/53864>

(Non-Patent Document 3) Tetsuya HAYASHI, et al., "125-μm-Cladding Eight-Core Multi-Core Fiber Realizing Ultra-High-Density Cable Suitable for O-Band Short-Reach Optical Interconnects," JOURNAL OF LIGHTWAVE TECHNOLOGY, VOL. 34, NO. 1, Jan. 1, 2016, pp. 85-92

(Non-Patent Document 4) M. Travagnin, "BER Penalty Induced by Coherent MPI Noise in FTTH Optical Links," JOURNAL OF LIGHTWAVE TECHNOLOGY, VOL. 31, NO. 18, Sep. 15, 2013, pp. 3021-3031

SUMMARY

A multi-core optical fiber (MCF) according to an embodiment of the disclosure comprises a plurality of cores, a common cladding, and a coating as one aspect. Each of the plurality of cores extends along the central axis of the multi-core optical fiber. The common cladding surrounds the plurality of cores and has a refractive index lower than that of each of the plurality of cores. The central axis of the MCF passes through the center of a cross section of the common cladding perpendicular to the central axis. The coating surrounds the common cladding. Furthermore, any of the plurality of cores has a coating leakage loss of 0.01 dB/km or more at a wavelength within a wavelength range of from 850 nm to 1700 nm. The coating includes a leaked light propagation suppressive coating layer. The leaked light propagation suppressive coating layer has a first optical property or a second optical property with respect to light having a wavelength within a wavelength range of from 850 nm to 1700 nm or from 1260 nm to 1625 nm. Herein, the first optical property is defined by an "absorbance per 1 μm thickness" as an attenuation index of the aforementioned light being 0.1 dB or more. The second optical property is defined by a product of the "absorbance per 1 μm thickness" and a "thickness" being 0.1 dB or more.

DETAILED DESCRIPTION

Problems to be Solved by the Invention

As a result of studying techniques in the related art, the inventors have found the following problem. That is, in a wavelength band where light leakage into a coating becomes prominent, an MCF in the related art shows deterioration in signal quality which cannot be explained by transmission loss due to the light leakage (decrease in light intensity). According to the findings of the inventors, the deterioration in signal quality is attributed to an interference between "light propagating through a core" and "a light component re-coupled to the core among light components leaked from the core to the coating."

The present disclosure has been made to solve the problem. An object of the disclosure is to provide an MCF having a structure that prevents deterioration in quality of an optical transmission signal due to a reflection component from a coating.

Advantageous Effects of Invention

An MCF according to the disclosure prevents deterioration in quality of an optical transmission signal.

Description of Embodiments of the Present Disclosure

The following descriptions are results of studies related to the above Non-Patent Documents 1 to 4.

Figure 1:
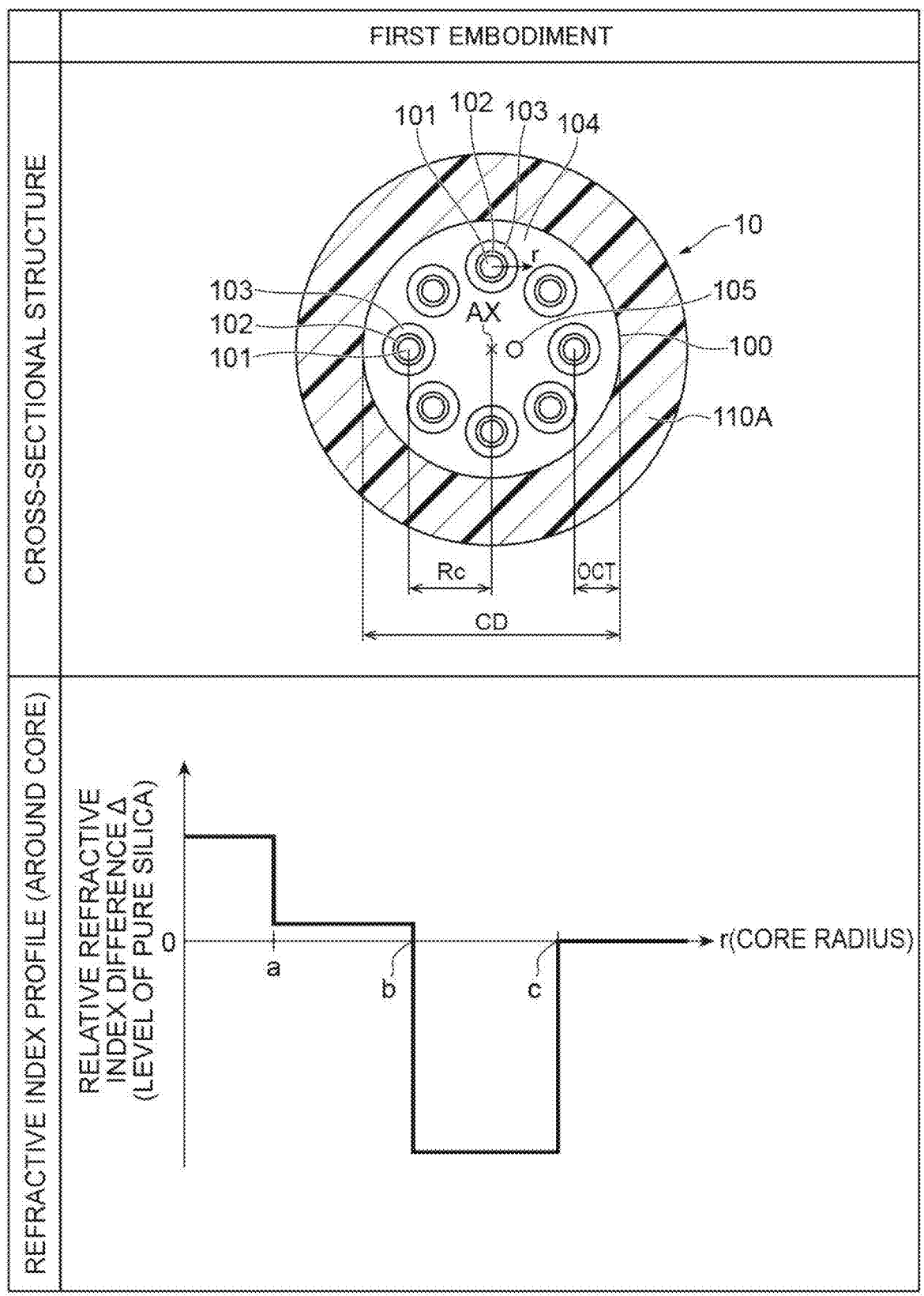
FIG. 1 is a view showing a cross-sectional structure of an MCF according to a first embodiment of the disclosure and a refractive index profile common to all the embodiments of the disclosure.

In the MCF disclosed in Non-Patent Document 1, as can be seen from FIG. 1, a transmission loss of an outer core (the outermost core in the cross section of the MCF perpendicular to the central axis) increases from around 1450 nm and causes vibrations like an interference pattern in a wavelength range of from 1450 nm to 1500 nm.

Figure 2:
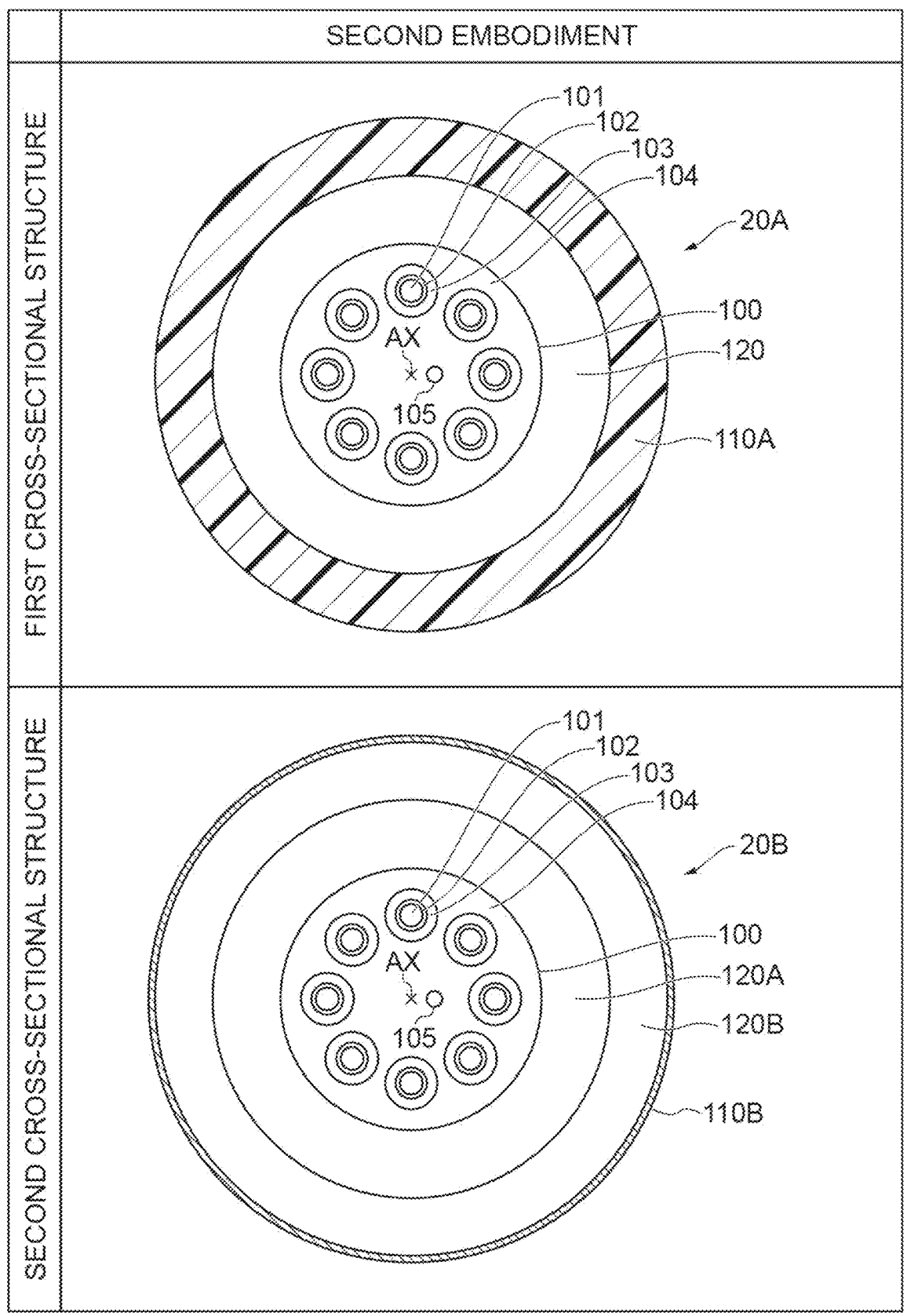
FIG. 2 is a view showing a first cross-sectional structure and a second cross-sectional structure of an MCF according to a second embodiment of the disclosure.

In the MCF disclosed in Non-Patent Document 2, as can be seen from FIG. 2.20, a transmission loss of an outer core increases from around 1400 nm and causes amplitudes like an interference pattern in a wavelength range of from 1400 nm to 1700 nm. This is caused by an interference between "light propagating through a core" and "a light component re-coupled to the core among light components leaked from the core to the coating".

Non-Patent Document 3 discloses an MCF including eight cores arranged in an annular shape inside a cladding with an outer diameter of 125 μm. Furthermore, FIG. 6(a) shows a loss spectrum of each core. As can be seen from FIG. 6(a), a leakage loss toward a coating is suppressed in O-band (a wavelength range of from 1260 nm to 1360 nm), but the leakage loss becomes prominent in a longer wavelength band than the O-band. In other words, in a wavelength band longer than the O-band, an interference pattern generated by an interference between "light propagating through a core" and "a light component re-coupled to the core among light components leaked from the core to the coating" becomes noticeable.

Non-Patent 4 discloses that a multi-path interference (MPI) deteriorates the quality of an optical transmission signal.

A multi-core optical fiber (MCF) according to the disclosure is provided with a leaked light propagation suppressive coating layer in or on a surface layer of a coating provided on the outer periphery of a bare fiber. This configuration makes it possible to suppress an intensity loss of a light component leaked from each core to the coating and to decrease the intensity of a leaked light component that re-couples to each core by reflecting on the coating surface toward each core. Accordingly, it is possible to prevent deterioration in quality of an optical transmission signal due to an interference between "light propagating through a core" and "a light component re-coupled to the core among light components leaked from the core to the coating." First, the details on embodiments of the disclosure will be recited and described individually.

(1) An MCF according to an aspect of the disclosure comprises a plurality of cores, a common cladding, and a coating. Each of the plurality of cores extends along a central axis of the MCF. The common cladding surrounds the plurality of cores and has a refractive index lower than that of each of the plurality of cores. The central axis of the MCF passes through the center of a cross section of the common cladding perpendicular to the central axis. The coating surrounds the common cladding. Furthermore, any of the plurality of cores has a coating leakage loss of 0.01 dB/km or more at a wavelength within a wavelength range of from 850 nm to 1700 nm. The coating includes a leaked light propagation suppressive coating layer. The leaked light propagation suppressive coating layer has a first optical property or a second optical property with respect to light having a wavelength within a wavelength range of from 850 nm to 1700 nm or from 1260 nm to 1625 nm. Herein, the first optical property is defined by an "absorbance per 1 μm thickness" as an attenuation index of the light within the wavelength range being 0.1 dB or more. The second optical property is defined when a product of the "absorbance per 1 μm thickness" and a "thickness" being 0.1 dB or more.

Among the plurality of cores, a difference in transmission loss between a core having the core center (cross-sectional center) closest to the coating and a core having the core center farthest from the coating may be 0.01 dB/km or more in a wavelength range of from 850 nm to 1700 nm. Even with such macrobending losses, the MCF according to the disclosure causes no interference pattern.

Herein, a "thickness" of a specific layer is given by a length from the inner periphery to the outer periphery of the specific layer along the radial direction perpendicular to the central axis (or by a difference between inner and outer diameters). Furthermore, a coating leakage loss in any of the plurality of cores can be measured by, for example, the method disclosed in the above Patent Document 1. In particular, a "coating leakage loss" refers to a transmission loss caused by intensity decrease of light guided through a core attributed to leakage of the light guided through the core into a coating having a higher refractive index than that of the core. When a coating leakage loss is too large to ignore, light of significant intensity leaks into the coating and propagates through the coating for a certain distance. Usually, "absorbance" of a resin or the like (absorption and scattering of a material itself) is a value obtained by preparing a "sheet" of a resin having a predetermined thickness and multiplying the common logarithm of light transmittance by −1. The absorbance herein is proportional to the thickness of the sheet (propagation length of light in the resin).

(2) As an aspect of the disclosure, the plurality of cores and the common cladding both preferably is comprised of silica glass. Furthermore, as an aspect of the disclosure, the coating is preferably comprised of an ultraviolet curable resin. The reason is that, as part of a manufacturing process of a typical silica glass-based optical fiber, it is possible to provide a resin including a leaked light propagation non-suppressive coating layer on a surface of a drawn bare fiber (the outer periphery of a common cladding).

(3) As an aspect of the disclosure, the coating preferably has a first structure or a second structure. The first structure is exclusively constituted by a plurality of leaked light propagation suppressive coating layers. The second structure is constituted by the leaked light propagation suppressive coating layers and a leaked light propagation non-suppressive coating layer having a third optical property defined by the "absorbance per 1 μm thickness" being 0.005 dB or less with respect to light within the above wavelength range. This configuration makes it possible to suppress deterioration in transmission loss of the light propagating through each core in the waveguide mode, even when part of the electric field of the light propagating through each core in the waveguide mode penetrates into the leaked light propagation non-suppressive coating.

(4) As an aspect of the disclosure, in a case where the coating includes a leaked light propagation suppressive coating layer and a leaked light propagation non-suppressive coating layer, the leaked light propagation non-suppressive coating layer is preferably provided on the outer periphery of the common cladding, and the leaked light propagation suppressive coating layer is preferably provided on the outer periphery of the leaked light propagation non-suppressive coating layer. Furthermore, as an aspect of the disclosure, the leaked light propagation non-suppressive coating layer preferably has a Young's modulus of 2 MPa or less, or 1 MPa or less. Still further, the leaked light propagation suppressive coating layer preferably has a Young's modulus of 0.8 GPa or more, 1 GPa or more, or 2 GPa or more. In this case, it is possible to obtain a sufficient effect of suppressing microbending applied to the inside of the MCF from the common cladding due to a lateral pressure on the MCF.

(5) As an aspect of the disclosure, the leaked light propagation non-suppressive coating layer may include a first leaked light propagation non-suppressive coating layer and a second leaked light propagation non-suppressive coating layer. In this case, the first leaked light propagation non-suppressive coating layer is preferably provided on the outer periphery of the common cladding, and the second leaked light propagation non-suppressive coating layer is preferably provided on the outer periphery of the first leaked light propagation non-suppressive coating layer. Furthermore, the leaked light propagation suppressive coating layer is preferably provided on the outer periphery of the second leaked light propagation non-suppressive coating layer. As an aspect of the disclosure, the first leaked light propagation non-suppressive coating layer preferably has a Young's modulus of 2 MPa or less, or 1 MPa or less. The second leaked light propagation non-suppressive coating layer preferably has a Young's modulus of 0.8 GPa or more, 1 GPa or more, or 2 GPa or more. Such a configuration also shows promise for suppression of microbending applied to the inside of the MCF from the common cladding due to a lateral pressure on the MCF.

(6) As an aspect of the disclosure, the leaked light propagation suppressive coating layer preferably has a thickness of 1 μm or more and 10 μm or less, or 1 μm or more and 5 μm or less. Furthermore, as an aspect of the disclosure, the leaked light propagation suppressive coating layer preferably produces a predetermined color by causing a predetermined reflection or scattering spectrum in response to irradiation of white light in the visible light region. In this case, an operator can identify the leaked light propagation suppressive coating layer, which makes it easier to handle the MCF.

(7) As an aspect of the disclosure, the leaked light propagation suppressive coating layer may be comprised of carbon and may be located on the outer periphery of the common cladding while being in contact with the outer periphery of the common cladding. In this case, as an aspect of the disclosure, the leaked light propagation suppressive coating layer preferably has a thickness of 10 nm or more and 1 μm or less. A thickness in the above range enables both suppression of leaked light propagation and flexibility of the optical fiber.

(8) On the other hand, as an aspect of the disclosure, the leaked light propagation suppressive coating layer may be comprised of a metal and may be located on the outer periphery of the common cladding while being in contact with the outer periphery of the common cladding. In this case, as an aspect of the disclosure, the leaked light propagation suppressive coating layer preferably has a thickness of 1 μm or more and 30 μm or less. A thickness in the above range enables both suppression of leaked light propagation and flexibility of the optical fiber.

(9) As an aspect of the disclosure, in a configuration where the leaked light propagation suppressive coating layer is directly provided on the outer periphery of the common cladding, the outer periphery of the leaked light propagation suppressive coating layer may be covered with a coating layer comprised of a resin. In this case, the coating comprised of a resin functions as a physical protecting layer of the leaked light propagation suppressive coating layer.

As described above, each aspect recited in [Description of Embodiments of the Present Disclosure] is applicable to other aspects or any combinations of the aspects.

Details of Embodiment of the Present Disclosure

Specific examples of the MCF according to the disclosure will be described in detail with reference to the accompanying drawings. Note that the present invention is not limited to the following examples but represented by the claims and designed to include contents equivalent to the claims and all modifications within the scope of the claims. In description of the drawings, note that the same elements will be denoted with the same reference numerals and redundant description will be omitted.

First Embodiment

FIG. 1 is a view showing a cross-sectional structure of a multi-core optical fiber (MCF) according to a first embodiment of the disclosure and a refractive index profile common to all the embodiments of the disclosure.

The upper part of FIG. 1 shows a cross-sectional structure of an MCF 10 according to the first embodiment perpendicular to a central axis AX. The MCF 10 comprises a bare fiber 100 and a coating provided on the outer periphery of the bare fiber 100. The bare fiber 100 includes eight cores 101 surrounding the central axis AX at regular intervals and equidistant from the central axis AX. In an area surrounded by the eight cores 101, there is provided a marker 105 for checking the position of each core 101. Each core 101 and the marker 105 extend along the central axis AX. An inner cladding 102 is provided on the outer periphery of each core 101, a trench 103 is provided on the outer periphery of each inner cladding 102, and a common cladding 104 is provided on the outer peripheries of the trenches 103. Each core 101, each inner cladding 102, each trench 103, and the common cladding 104 is preferably comprised of silica glass. Furthermore, the coating provided on the outer periphery of the bare fiber 100 is preferably comprised of an ultraviolet curable resin. In spinning of optical fibers, a resin solution applied to the outer periphery of the common cladding 104 is irradiated with ultraviolet rays so as to facilitate the production of a coated optical fiber (the MCF 10) with good manufacturability.

"Rc" in the upper part of FIG. 1 indicates a length from the cross-sectional center of the MCF 10 (through which the central axis AX passes and which is hereinafter simply referred to as "center") to the cross-sectional center of each core 101 (hereinafter simply referred to as "center"). "OCT" indicates the shortest length from the center of each core 101 to the interface between the common cladding 104 and the coating. "CD" indicates the outer diameter of the bare fiber 100 (corresponding to the outer diameter of the common cladding 104).

The lower part of FIG. 1 shows a refractive index profile around each core 101 in the MCF 10. This refractive index profile shows a relative refractive index difference (using a refractive index of the common cladding 104 as a benchmark) at a position of a length r from the center of each core 101 (a length along the radial direction of each core 101 which is referred to as "core radius" in FIG. 1). A length a indicates the radius of each core 101. A length b indicates the length from the center of each core 101 to the outer periphery of each inner cladding 102 (outer radius of each inner cladding 102). A length c indicates the length from the center of each core 101 to the outer periphery of each trench 103 (outer radius of each trench 103). As shown in the refractive index profile of FIG. 1, around each core 101, each inner cladding 102 has a refractive index lower than that of each core 101. Each trench 103 has a refractive index lower than that of each inner cladding 102. The common cladding 104 has a refractive index higher than that of each trench 103 and lower than that of each core 101 and that of each inner cladding 102. The refractive index profile in the lower part of FIG. 1 is an example where the common cladding 104 is comprised of pure silica. However, constituent materials of the common cladding 104 may be silica glass that contains impurities (refractive index adjusting agent).

Any one of the eight cores 101 has a coating leakage loss of 0.01 dB/km or more at a wavelength within a wavelength range of from 850 nm to 1700 nm (the coating leakage loss can be measured, for example, by the method recited in the above Patent Document 1. Among the eight cores 101, a difference in transmission loss between a core having the core center closest to the coating and a core having the core center farthest from the coating may be 0.01 dB/km or more in a wavelength range of from 850 nm to 1700 nm. Even with such macrobending losses, the MCF 10 according to the disclosure causes no interference pattern.

In this first embodiment, the coating of MCF 10 is composed of a leaked light propagation suppressive coating layer 110A comprised of a resin (UV protection effect resin). The leaked light propagation suppressive coating layer 110A has a first optical property or a second optical property with respect to light having a wavelength within a wavelength range of from 850 nm to 1700 nm or from 1260 nm to 1625 nm. The first optical property is defined when "absorbance per 1 µm thickness" or an attenuation index of the light within the wavelength range is 0.1 dB or more. The second optical property is defined when a product of "absorbance per 1 µm thickness" and a "thickness" is 0.1 dB or more.

Note that "absorbance" which is also referred to as optical density is a dimensionless quantity in spectroscopy indicating how much the intensity of light is decreased when the light passes through a certain object. In spectrochemical, absorbance $A_\lambda$ at a wavelength $\lambda$ is defined as $A_\lambda = -\log_{10}(I/I_O)$. As an example, "absorbance per 1 µm thickness" of a substance having a thickness T (unit: µm) is given by $-(\log_{10}(I/I_O))/T$. In other words, these equations are given by the common logarithm of a ratio (transmittance) of incident light intensity $I_O$ to transmitted light intensity I, and both equations use a minus sign because a value when light is absorbed should be positive. The transmittance attenuates exponentially with respect to an optical path length, while the absorbance is expressed logarithmically and is directly proportional to the optical path length. For example, in a case where the thickness of an object with a transmittance of 0.1 (absorbance is 1) triples, the transmittance is $0.1^3 = 0.001$ while the absorbance simply triples.

Second Embodiment

FIG. 2 is a view showing a first cross-sectional structure and a second cross-sectional structure of a multi-core optical fiber (MCF) according to a second embodiment of the disclosure.

MCFs 20A and 20B according to the second embodiment are different in coating structure from the MCF 10 according to the first embodiment shown in the upper part of FIG. 1. On the other hand, the MCFs 20A and 20B according to the second embodiment both include a bare fiber (silica-based optical fiber) having a cross-sectional structure similar to that of the bare fiber 100 included in the MCF 10 according to the first embodiment.

In the MCF 20A according to the second embodiment shown in the upper part of FIG. 2, a coating includes a leaked light propagation non-suppressive coating layer 120 provided on the outer periphery of a common cladding 104 and a leaked light propagation suppressive coating layer 110A comprised of a resin and provided on the outer periphery of the leaked light propagation non-suppressive coating layer 120. The leaked light propagation non-suppressive coating layer 120 has a third optical property, that is, "absorbance per 1 µm thickness" of 0.005 dB or less with respect to light having a wavelength within a wavelength range of from 850 nm to 1700 nm or from 1260 nm to 1625 nm. On the other hand, the leaked light propagation suppressive coating layer 110A has the aforementioned first optical property or second optical property as similar to the first embodiment. This configuration makes it possible to suppress deterioration in transmission loss of light propagating through each core 101 in the waveguide mode even when part of the electric field of the light propagating through each core 101 in the waveguide mode penetrates into the leaked light propagation non-suppressive coating layer 120. Furthermore, in order to obtain the effect of suppressing microbending applied to the inside of the MCF 20A from the common cladding 104 due to a lateral pressure on the MCF 20A, the leaked light propagation non-suppressive coating layer 120 preferably has a Young's modulus of 2 MPa or less and more preferably 1 MPa or less. On the other hand, the leaked light propagation suppressive coating layer 110A preferably has a Young's modulus of 0.8 GPa or more, more preferably 1 GPa or more, and still more preferably 2 GPa or more.

In the MCF 20B according to the second embodiment shown in the lower part of FIG. 2, a coating includes a first leaked light propagation non-suppressive coating layer 120A provided on the outer periphery of a common cladding 104 and a second leaked light propagation non-suppressive coating layer 120B provided on the outer periphery of the first leaked light propagation non-suppressive coating layer 120A. A leaked light propagation suppressive coating layer 110B is provided on the outer periphery of the second leaked light propagation non-suppressive coating layer 120B. This configuration also makes it possible to suppress deterioration in transmission loss of light propagating through each core 101 in the waveguide mode even when part of the electric field of the light propagating through each core 101 in the waveguide mode penetrates into the leaked light propagation non-suppressive coating layers 120A and 120B. Furthermore, in order to obtain the effect of suppressing microbending applied to the inside of the MCF 20B from the common cladding 104 due to a lateral pressure on the MCF 20B, the first leaked light propagation non-suppressive coating layer 120A preferably has a Young's modulus of 2 MPa or less and more preferably 1 MPa or less. On the other hand, the second leaked light propagation non-suppressive coating layer 120B preferably has a Young's modulus of 0.8 GPa or more, more preferably 1 GPa or more, and still more preferably 2 GPa or more. Here, the leaked light propagation suppressive coating layer 110B preferably has a thickness of 1 µm or more and 10 µm or less, and more preferably 1 µm or more and 5 µm or less.

In both MCFs 20A and 20B according to the second embodiment, the entire coating provided on the outer periphery of the common cladding 104 is comprised of a resin.

In MCF 20A and 20B according to the second embodiment, the coating is preferably comprised of an ultraviolet curable resin. In spinning of optical fibers, a resin solution applied to the outer periphery of the common cladding 104 is irradiated with ultraviolet rays so as to facilitate the production of a coated optical fiber (the MCFs 20A and 20B) with good manufacturability.

Furthermore, as in the MCF 20A and 20B according to the second embodiment, in a configuration where the leaked light propagation suppressive coating layer 110A is provided outside the leaked light propagation non-suppressive coating layer 120, or in a configuration where the leaked light propagation suppressive coating layer 110B is provided outside the first leaked light propagation non-suppressive coating layer 120A and the second leaked light propagation non-suppressive coating layer 120B, the leaked light propagation suppressive coating layer 110A and the leaked light propagation suppressive coating layer 110B both preferably produce a predetermined color by causing a predetermined reflection or scattering spectrum in response to irradiation of white light in the visible light region. Specifically, the leaked light propagation suppressive coating layer 110A and the leaked light propagation suppressive coating layer 110B preferably produce a predetermined color such as red, blue, yellow, green, black, white, gray, orange, and peach. Accordingly, an operator can identify the leaked light propagation suppressive coating layers 110A and 110B, which makes it easier to handle the MCFs 20A and 20B.

Third Embodiment

Figure 3:
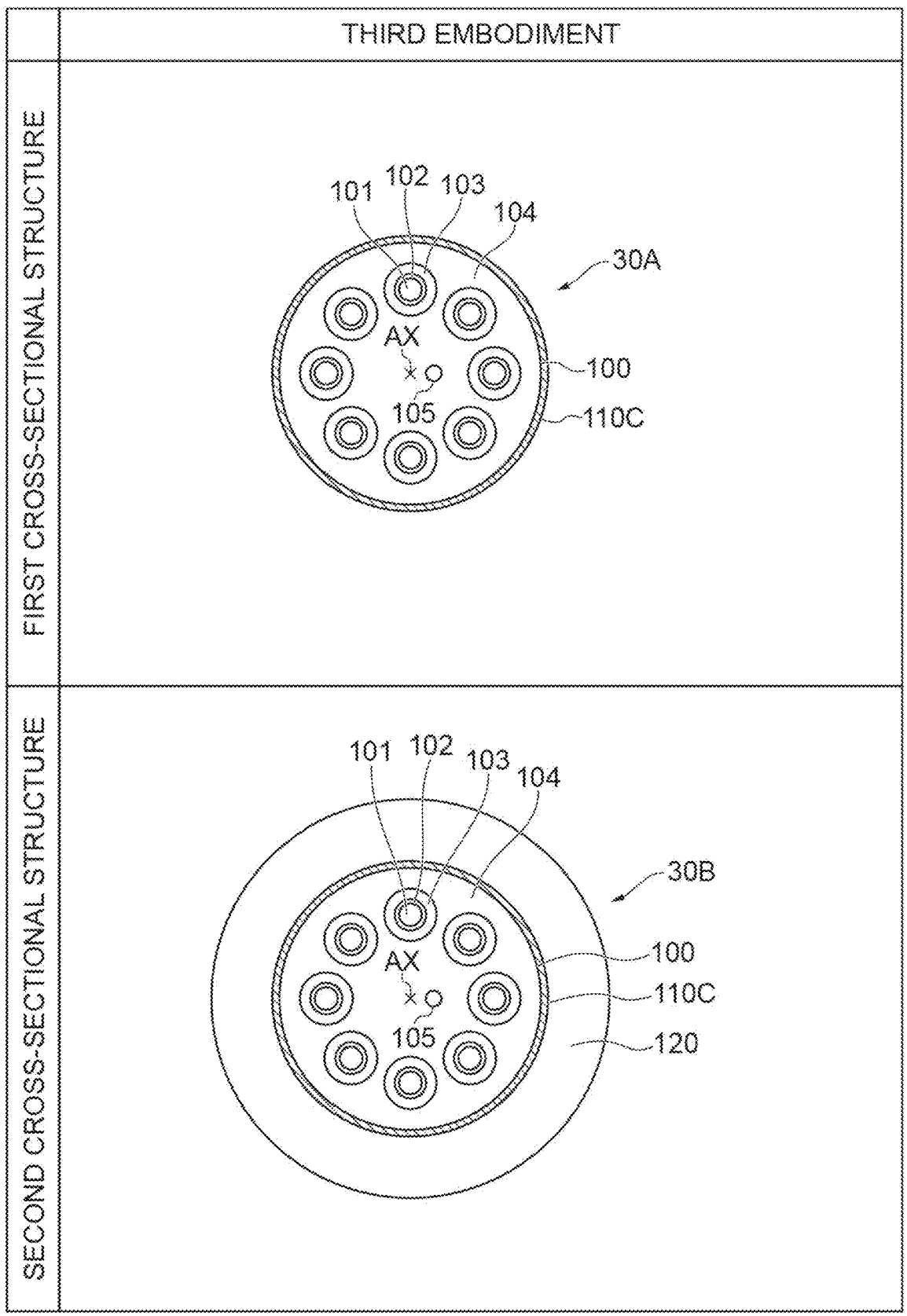
FIG. 3 is a view showing a first cross-sectional structure and a second cross-sectional structure of an MCF according to a third embodiment of the disclosure.

FIG. 3 is a view showing a first cross-sectional structure and a second cross-sectional structure of a multi-core optical fiber (MCF) according to a third embodiment of the disclosure.

MCFs 30A and 30B according to the third embodiment are different in coating structure from the MCF 10 according to the first embodiment shown in the upper part of FIG. 1 and from the MCFs 20A and 20B according to the second embodiment. On the other hand, the MCFs 30A and 30B according to the third embodiment both include a bare fiber (silica-based optical fiber) having a cross-sectional structure similar to that of the bare fiber 100 included in the MCF 10 according to the first embodiment.

In both MCFs 30A and 30B according to the third embodiment, a leaked light propagation suppressive coating layer 110C comprised of carbon (non-metal) or a metal is provided on the outer periphery of a bare fiber 100 (on the outer periphery of a common cladding 104). Particularly, in the MCF 30A according to the third embodiment shown in the upper part of FIG. 3, a carbon coating serving as the leaked light propagation suppressive coating layer 110C is provided on the outer periphery of the bare fiber 100. As in the MCF 30A, when the leaked light propagation suppressive coating layer 110C comprised of carbon (non-metal) is employed, the leaked light propagation suppressive coating layer 110C preferably has a thickness of 10 nm or more and 1 μm or less. On the other hand, in the MCF 30B shown in the lower part of FIG. 3, a metal coating serving as the leaked light propagation suppressive coating layer 110C is provided on the outer periphery of the bare fiber 100. As in the MCF 30B, when the leaked light propagation suppressive coating layer 110C comprised of a metal is employed, the leaked light propagation suppressive coating layer 110C preferably has a thickness of 1 μm or more and 30 μm or less. In the MCF 30B, a leaked light propagation non-suppressive coating layer (coating layer comprised of a resin) 120 for protecting the leaked light propagation suppressive coating layer 110C is provided on the outer periphery of the leaked light propagation suppressive coating layer 110C. A leaked light propagation non-suppressive coating layer may be provided on the carbon coating.

In this manner, in a case where the leaked light propagation suppressive coating layer 110C is comprised of carbon or a metal, it is possible to prevent propagation of leaked light in the aforementioned thickness range and to achieve flexibility of the optical fiber.

Fourth Embodiment

Figure 4:
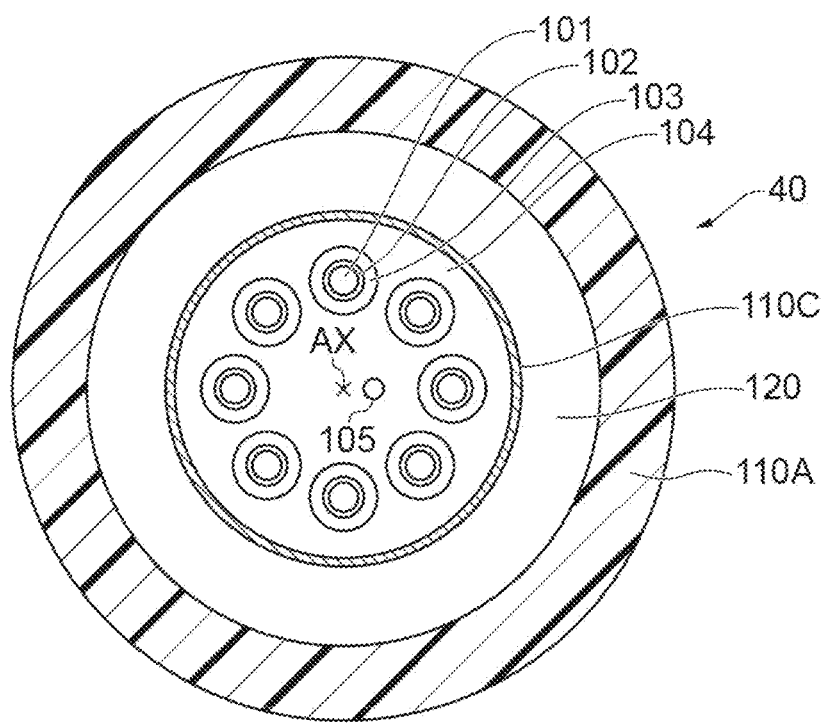
FIG. 4 is a view showing a cross-sectional structure of an MCF according to a fourth embodiment of the disclosure.

FIG. 4 is a view showing a cross-sectional structure a multi-core optical fiber (MCF) according to a fourth embodiment of the disclosure.

An MCF 40 according to the fourth embodiment is different in coating structure from the MCF 10 according to the first embodiment shown in the upper part of FIG. 1 and from the MCFs 20A and 20B according to the second embodiment and from the MCFs 30A and 30B according to the third embodiment. On the other hand, the MCF 40 according to the fourth embodiment includes a bare fiber (silica-based optical fiber) having a cross-sectional structure similar to that of the bare fiber 100 included in the MCF 10 according to the first embodiment.

On the outer periphery of a bare fiber 100 (on the outer periphery of a common cladding 104), the MCF 40 according to the fourth embodiment has a coating structure in which the structures in the second and third embodiments are combined. In other words, the coating of the MCF 40 according to the fourth embodiment comprises a leaked light propagation suppressive coating layer 110C on the outer periphery of the common cladding 104 (third embodiment), a leaked light propagation non-suppressive coating layer 120 on the outer periphery of the leaked light propagation suppressive coating layer 110C, and a leaked light propagation suppressive coating layer 110A on the outer periphery of the leaked light propagation non-suppressive coating layer 120 (second embodiment).

The leaked light propagation suppressive coating layer 110C shown in FIG. 4 is comprised of carbon or a metal. When the leaked light propagation suppressive coating layer 110C comprised of carbon is provided on the outer periphery of the common cladding 104, the leaked light propagation suppressive coating layer 110C preferably has a thickness of 10 nm or more and 1 μm or less. On the other hand, when the leaked light propagation suppressive coating layer 110C comprised of a metal is provided on the outer periphery of the common cladding 104, the leaked light propagation suppressive coating layer 110C preferably has a thickness of 1 μm or more and 30 μm or less. Furthermore, the leaked light propagation suppressive coating layer 110A shown in FIG. 4 is provided on the outer periphery of the leaked light propagation non-suppressive coating layer 120 (the resin layer provided on the outer periphery of the leaked light propagation suppressive coating layer 110C) and is comprised of a resin.

In the MCF 40 according to the fourth embodiment shown in FIG. 4, the coating provided on the outer periphery of the bare fiber 100 includes the leaked light propagation suppressive coating layer 110A and the leaked light propagation suppressive coating layer 110C different from each other and sandwiching the leaked light propagation non-suppressive coating layer 120. Accordingly, it is possible to suppress propagation of leaked light more reliably as well as to ensure flexibility of the optical fiber.

Note that the leaked light propagation suppressive coating layer 110A comprised of a resin, the leaked light propagation suppressive coating layer 110B comprised of a resin, and the leaked light propagation suppressive coating layer 110C comprised of carbon or a metal which are employed in the first to fourth embodiments each have the first optical property or the second optical property with respect to light having a wavelength within a wavelength range of from 850 nm to 1700 nm or from 1260 nm to 1625 nm. The first optical property is defined when "absorbance per 1 μm thickness" or an attenuation index of the light within the wavelength range is 0.1 dB or more. The second optical property is defined when a product of "absorbance per 1 μm thickness" and a "thickness" is 0.1 dB or more.

(Measurement Result)

Figure 5:
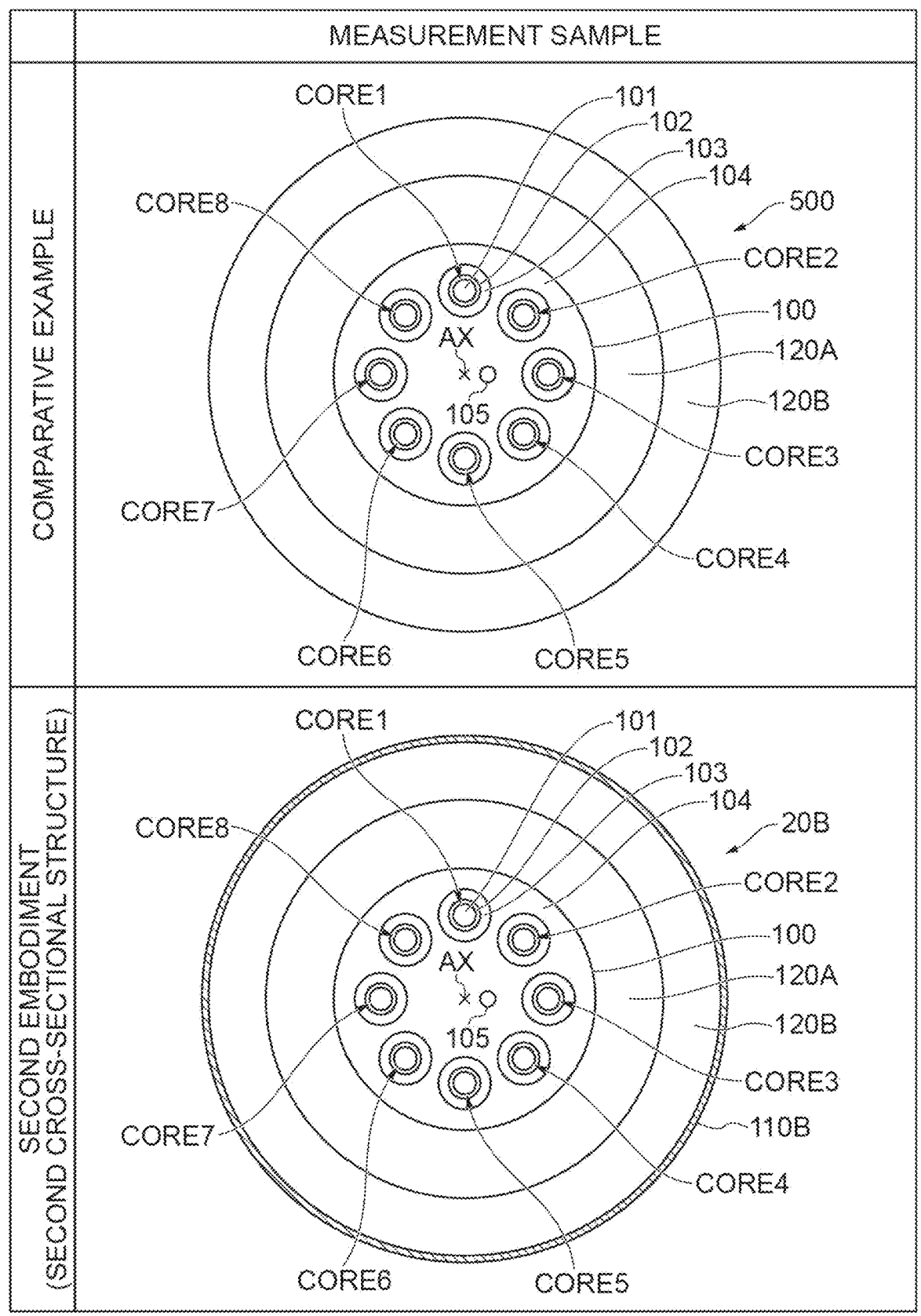
FIG. 5 is a view showing a cross-sectional structure of an MCF according to Comparative Example prepared as a measurement sample and the second cross-sectional structure of the MCF according to the second embodiment.
Figure 6:
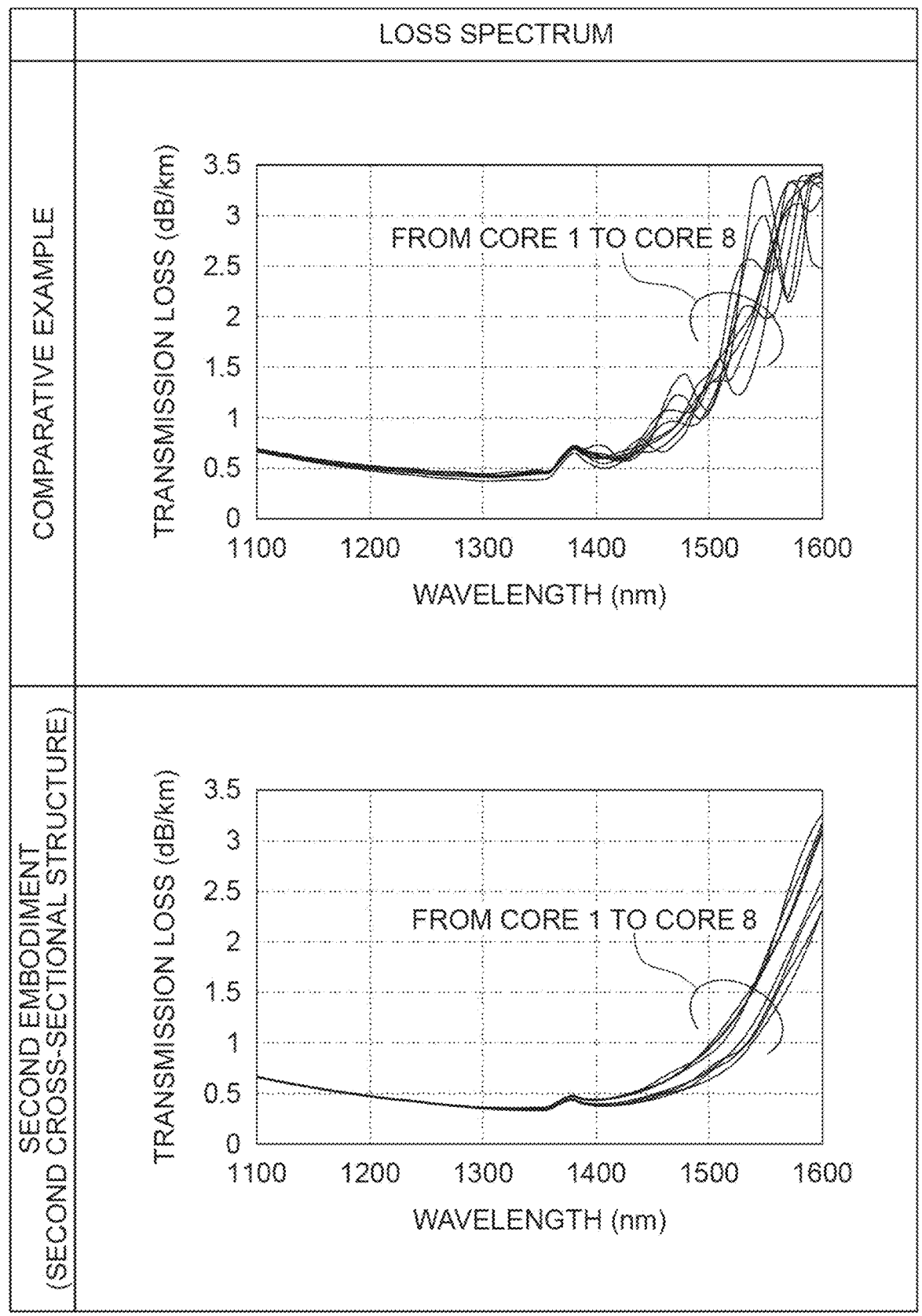
FIG. 6 is a view showing a loss spectrum of each core (CORE 1 to CORE 8) in the MCF according to Comparative Example and a loss spectrum of each core (CORE 1 to CORE 8) in the MCF according to the second embodiment.

FIG. 5 is a view showing a cross-sectional structure of an MCF 500 according to Comparative Example prepared as a measurement sample and the second cross-sectional structure of the MCF 20B according to the second embodiment. FIG. 6 is a view showing a loss spectrum of each core 101 (CORE 1 to CORE 8) in the MCF 500 according to Comparative Example and a loss spectrum of each core 101 (CORE 1 to CORE 8) in the MCF 20B according to the second embodiment. As a technical effect of a leaked light propagation suppressive coating layer, the inventors have conducted experiment and confirmed the effect of suppressing an interference between "light propagating through a core" and "a light component re-coupled to the core among light components leaked from the core to the coating."

The MCF 500 (upper part of FIG. 5) prepared according to Comparative Example and the MCF 20B (lower part of FIG. 5) according to the second embodiment each include a bare fiber having an identical cross-sectional structure. In other words, the MCF 500 and MCF 20B are both obtained by drawing an identical optical fiber base material and are different only in structure of the coating.

In the bare fiber 100, using a refractive index of the common cladding 104 as a benchmark (for example, the level of pure silica), a relative refractive index difference of each core 101 is 0.35±0.05% (0.30% or more and 0.40% or less), a relative refractive index difference of each inner cladding 102 is 0.05±0.05% (0% or more and 0.1% or less), and a relative refractive index difference of each trench 103 is −0.70±0.05% (−0.75% or more and −0.65% or less). Each core 101 has an outer diameter (diameter) 2a of 6.4±0.5 μm (5.9 μm or more and 6.9 μm or less). A ratio a/b of the outer diameter 2a of each core 101 to the outer diameter (inner diameter of each trench) 2b of each inner cladding 102 is 0.4±0.05 (0.35 or more and 0.45 or less). A ratio b/c of the outer diameter 2b of each inner cladding 102 to the outer diameter 2c of each trench 103 is 0.6±0.1 (0.5 or more and 0.7 or less).

The common cladding 104 has an outer diameter CD of 125±15 μm (110 μm or more and 140 μm or less). A length Rc from the center of the common cladding 104 (the center of a cross section intersecting the central axis AX) to the center of each core 101 is 40.5±1.5 μm (39.0 μm or more and 42 μm or less). The shortest length OCT from the center (center of the cross section) of each core 101 to the interface between the common cladding 104 and the coating is 22±2 μm (20 μm or more and 24 μm or less).

The coating of the MCF 500 according to Comparative Example (the upper part in FIG. 5) includes a first leaked light propagation non-suppressive coating layer 120A provided on the outer periphery of the common cladding 104 and a second leaked light propagation non-suppressive coating layer 120B provided on the outer periphery of the first leaked light propagation non-suppressive coating layer 120A. This MCF 500 according to Comparative Example does not include a leaked light propagation suppressive coating layer. The coating including the first leaked light propagation non-suppressive coating layer 120A and the second leaked light propagation non-suppressive coating layer 120B has an outer diameter of 250±15 μm (235 μm or more and 265 μm or less). The first leaked light propagation non-suppressive coating layer 120A and the second leaked light propagation non-suppressive coating layer 120B have "absorbance per 1 μm thickness" of 0.003 dB/μm or less in a wavelength range of from 850 nm to 1700 nm and 0.0015 dB/μm or less in a wavelength range of from 850 nm to 1600 nm.

On the other hand, the coating of the MCF 20B according to the second embodiment (the lower part of FIG. 5) includes the first leaked light propagation non-suppressive coating layer 120A on the outer periphery of the common cladding 104, the second leaked light propagation non-suppressive coating layer 120B on the outer periphery of the first leaked light propagation non-suppressive coating layer 120A, and the leaked light propagation suppressive coating layer 110B on the outer periphery of the second leaked light propagation non-suppressive coating layer 120B. In the MCF 20B according to the second embodiment, the first leaked light propagation non-suppressive coating layer 120A and the second leaked light propagation non-suppressive coating layer 120B have an identical structure to the MCF 500 according to Comparative Example.

Furthermore, in the MCF 20B (lower part of FIG. 5) according to the second embodiment, the leaked light propagation suppressive coating layer 110B has a thickness of 3±2 μm (1 μm or more and 5 μm or less). The leaked light propagation suppressive coating layer 110B has "absorbance per 1 μm thickness" of 0.1 dB/μm or more in the entire wavelength range of from 850 nm to 1700 nm. A product of "absorbance per 1 μm thickness" and a "thickness" is 0.3±0.2 dB or more (0.1 dB or more or 0.5 dB or more).

Comparing the loss spectrum of each core 101 (CORE 1 to CORE 8) shown in the upper part of FIG. 6 (the MCF 500 according to Comparative Example) and the loss spectrum of each core 101 (CORE 1 to CORE 8) in the lower part of FIG. 6 (the MCF 20B according to the second embodiment), in a wavelength range of from 1300 nm to 1400 nm, both MCFs have common in that the transmission loss tends to increase with an increase in wavelength attributed to leakage to the coating. However, the MCF 500 according to Comparative Example shows a prominent interference pattern (amplitude) in the transmission loss spectrum in a long wavelength region over the wavelength range of from 1300 nm to 1400 nm. In other words, in the MCF 500 according to Comparative Example, there is an intense interference between "light propagating through a core" and "a light component re-coupled to the core among light components leaked from the core to the coating" in a long wavelength region over the wavelength range of from 1300 nm to 1400 nm.

On the other hand, it can be seen that the MCF 20B according to the second embodiment enables suppression of an interference between "light propagating through a core" and "a light component re-coupled to the core among light components leaked from the core to the coating" even in a long wavelength region over the wavelength range of from 1300 nm to 1400 nm. Therefore, when a transmission line employs any of the MCFs (MCF 10, MCF 20A, MCF 20B, MCF 30A, MCF 30B, and MCF 40) according to the embodiments that suppresses an interference between "light propagating through a core" and "a light component re-coupled to the core among light components leaked from the core to the coating," although there is an increase in transmission loss, it is possible to transmit light signals without deterioration in signal quality attributed to the interference even in a wavelength band where the coating leakage loss significantly increases (a wavelength range of from 1400 nm to 1600 nm in the example shown in FIG. 6).

What is claimed is:

1. A multi-core optical fiber comprising:
   a plurality of cores extending along a central axis;
   a common cladding surrounding the plurality of cores and having a refractive index lower than a refractive index of each of the plurality of cores; and a coating surrounding the common cladding,
wherein any one of the plurality of cores has a coating leakage loss of 0.01 dB/km or more at a wavelength within a wavelength range of from 850 nm to 1700 nm, and
the coating includes a leaked light propagation suppressive coating layer having a first optical property or a second optical property with respect to light having a wavelength within a wavelength range of from 850 nm to 1700 nm, the first optical property being defined by, as an attenuation index of the light, an absorbance per 1 μm thickness being 0.1 dB or more and the second optical property being defined by a product of the absorbance per 1 μm thickness and a thickness being 0.1 dB or more.

2. The multi-core optical fiber according to claim 1,
wherein the plurality of cores and the common cladding both are comprised of silica glass.

3. The multi-core optical fiber according to claim 1,
wherein the coating is comprised of an ultraviolet curable resin.

4. The multi-core optical fiber according to claim 1,
wherein the coating further includes a leaked light propagation non-suppressive coating layer having a third optical property defined by the absorbance per 1 μm thickness being 0.005 dB or less with respect to the light.

5. The multi-core optical fiber according to claim 4,
wherein the leaked light propagation non-suppressive coating layer is provided on an outer periphery of the common cladding, and the leaked light propagation suppressive coating layer is provided on an outer periphery of the leaked light propagation non-suppressive coating layer.

6. The multi-core optical fiber according to claim 5,
wherein the leaked light propagation non-suppressive coating layer has a Young's modulus of 2 MPa or less, and
the leaked light propagation suppressive coating layer has a Young's modulus of 0.8 GPa or more.

7. The multi-core optical fiber according to claim 4,
wherein the leaked light propagation non-suppressive coating layer includes a first leaked light propagation non-suppressive coating layer provided on an outer periphery of the common cladding and a second leaked light propagation non-suppressive coating layer provided on an outer periphery of the first leaked light propagation non-suppressive coating layer, and
the leaked light propagation suppressive coating layer is provided on an outer periphery of the second leaked light propagation non-suppressive coating layer.

8. The multi-core optical fiber according to claim 7,
wherein the first leaked light propagation non-suppressive coating layer has a Young's modulus of 2 MPa or less, and
the second leaked light propagation non-suppressive coating layer has a Young's modulus of 0.8 GPa or more.

9. The multi-core optical fiber according to claim 7,
wherein the leaked light propagation suppressive coating layer has a thickness of 1 μm or more and 10 μm or less.

10. The multi-core optical fiber according to claim 8,
wherein the leaked light propagation suppressive coating layer has a thickness of 1 μm or more and 10 μm or less.

11. The multi-core optical fiber according to claim 1,
wherein the leaked light propagation suppressive coating layer produces a predetermined color by causing a predetermined reflection or scattering spectrum in response to irradiation of white light in a visible light region.

12. The multi-core optical fiber according to claim 1,
wherein the leaked light propagation suppressive coating layer is comprised of carbon and is located on an outer periphery of the common cladding while being in contact with the outer periphery of the common cladding.

13. The multi-core optical fiber according to claim 12,
wherein the leaked light propagation suppressive coating layer has a thickness of 10 nm or more and 1 μm or less.

14. The multi-core optical fiber according to claim 1,
wherein the leaked light propagation suppressive coating layer is comprised of a metal and is located on an outer periphery of the common cladding while being in contact with the outer periphery of the common cladding.

15. The multi-core optical fiber according to claim 14,
wherein the leaked light propagation suppressive coating layer has a thickness of 1 μm or more and 30 μm or less.

16. The multi-core optical fiber according to claim 12,
wherein the leaked light propagation suppressive coating layer has an outer periphery covered with a coating layer comprised of a resin.

17. The multi-core optical fiber according to claim 5,
wherein the leaked light propagation non-suppressive coating layer has a Young's modulus of 1 MPa or less, and
the leaked light propagation suppressive coating layer has a Young's modulus of 2 GPa or more.

18. The multi-core optical fiber according to claim 7,
wherein the first leaked light propagation non-suppressive coating layer has a Young's modulus of 1 MPa or less, and
the second leaked light propagation non-suppressive coating layer has a Young's modulus of 2 GPa or more.

19. The multi-core optical fiber according to claim 7,
wherein the leaked light propagation suppressive coating layer has a thickness of 1 μm or more and 5 μm or less.

20. The multi-core optical fiber according to claim 18,
wherein the leaked light propagation suppressive coating layer has a thickness of 1 μm or more and 5 μm or less.

21. A multi-core optical fiber comprising:
a plurality of cores extending along a central axis;
a common cladding surrounding the plurality of cores and having a refractive index lower than a refractive index of each of the plurality of cores; and
a coating surrounding the common cladding,
wherein any one of the plurality of cores has a coating leakage loss of 0.01 dB/km or more at a wavelength within a wavelength range of from 850 nm to 1700 nm, and
the coating includes a leaked light propagation suppressive coating layer having a first optical property or a second optical property with respect to light having a wavelength within a wavelength range of from 1260 nm to 1625 nm, the first optical property being defined by, as an attenuation index of the light, an absorbance per 1 μm thickness being 0.1 dB or more and the second optical property being defined by a product of the absorbance per 1 μm thickness and a thickness being 0.1 dB or more.

22. The multi-core optical fiber according to claim 21,
wherein the coating further includes a leaked light propagation non-suppressive coating layer having a third optical property defined by the absorbance per 1 µm thickness being 0.005 dB or less with respect to the light.

23. The multi-core optical fiber according to claim 22,
wherein the leaked light propagation non-suppressive coating layer is provided on an outer periphery of the common cladding, and the leaked light propagation suppressive coating layer is provided on an outer periphery of the leaked light propagation non-suppressive coating layer.

24. The multi-core optical fiber according to claim 22,
wherein the leaked light propagation non-suppressive coating layer includes a first leaked light propagation non-suppressive coating layer provided on an outer periphery of the common cladding and a second leaked light propagation non-suppressive coating layer provided on an outer periphery of the first leaked light propagation non-suppressive coating layer, and the leaked light propagation suppressive coating layer is provided on an outer periphery of the second leaked light propagation non-suppressive coating layer.

25. The multi-core optical fiber according to claim 21,
wherein the leaked light propagation suppressive coating layer produces a predetermined color by causing a predetermined reflection or scattering spectrum in response to irradiation of white light in a visible light region.

26. The multi-core optical fiber according to claim 21,
wherein the leaked light propagation suppressive coating layer is comprised of carbon and is located on an outer periphery of the common cladding while being in contact with the outer periphery of the common cladding.

27. The multi-core optical fiber according to claim 21,
wherein the leaked light propagation suppressive coating layer is comprised of a metal and is located on an outer periphery of the common cladding while being in contact with the outer periphery of the common cladding.

28. The multi-core optical fiber according to claim 26,
wherein the leaked light propagation suppressive coating layer has an outer periphery covered with a coating layer comprised of a resin.

\* \* \* \* \*